April 2, 1957   N. DANNENHOFFER ET AL   2,787,548
INFUSION PACKAGES AND METHODS OF MAKING SAME
Filed Sept. 2, 1955   5 Sheets-Sheet 1

INVENTORS
NICHOLAS DANNENHOFFER
ALFRED EINSLE
BY
Edward G. Roe
ATTORNEY

April 2, 1957  N. DANNENHOFFER ET AL  2,787,548
INFUSION PACKAGES AND METHODS OF MAKING SAME
Filed Sept. 2, 1955  5 Sheets-Sheet 2

INVENTORS
NICHOLAS DANNENHOFFER
ALFRED EINSLE
BY
Edward G. Roe
ATTORNEY

INVENTORS
NICHOLAS DANNENHOFFER
BY ALFRED EINSLE

ATTORNEY

April 2, 1957 N. DANNENHOFFER ET AL 2,787,548
INFUSION PACKAGES AND METHODS OF MAKING SAME
Filed Sept. 2, 1955
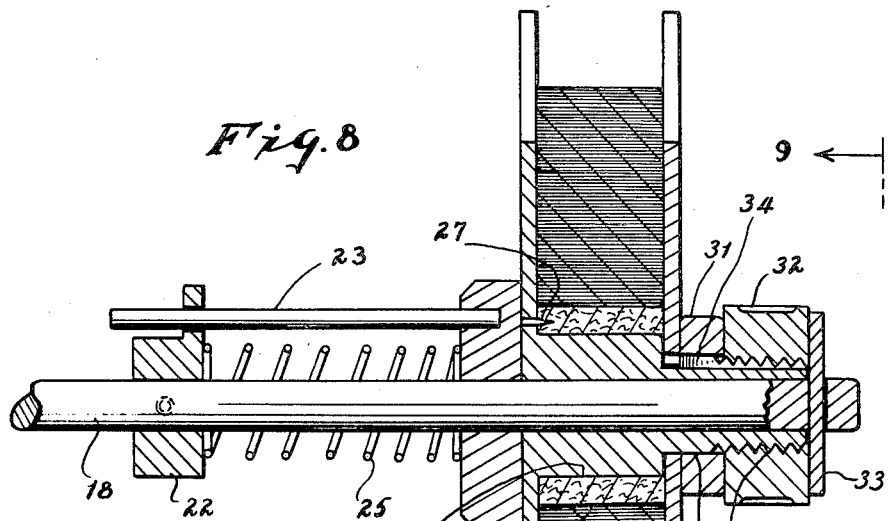
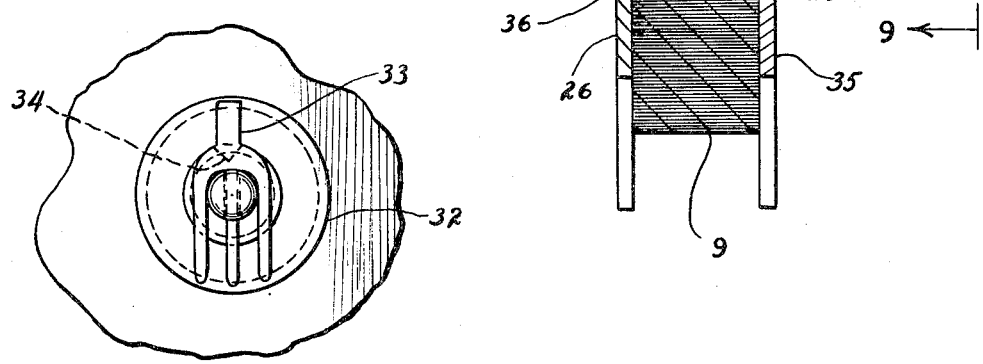
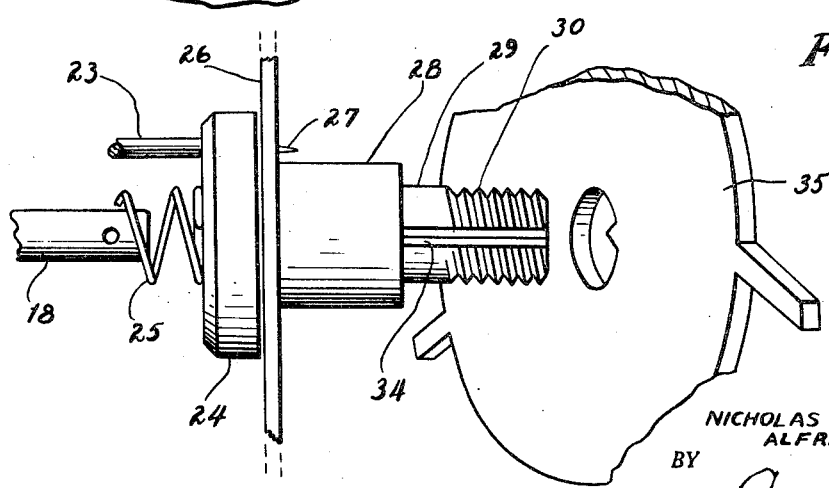
INVENTORS
NICHOLAS DANNENHOFFER
ALFRED EINSLE
BY
Edward G. Roe
ATTORNEY

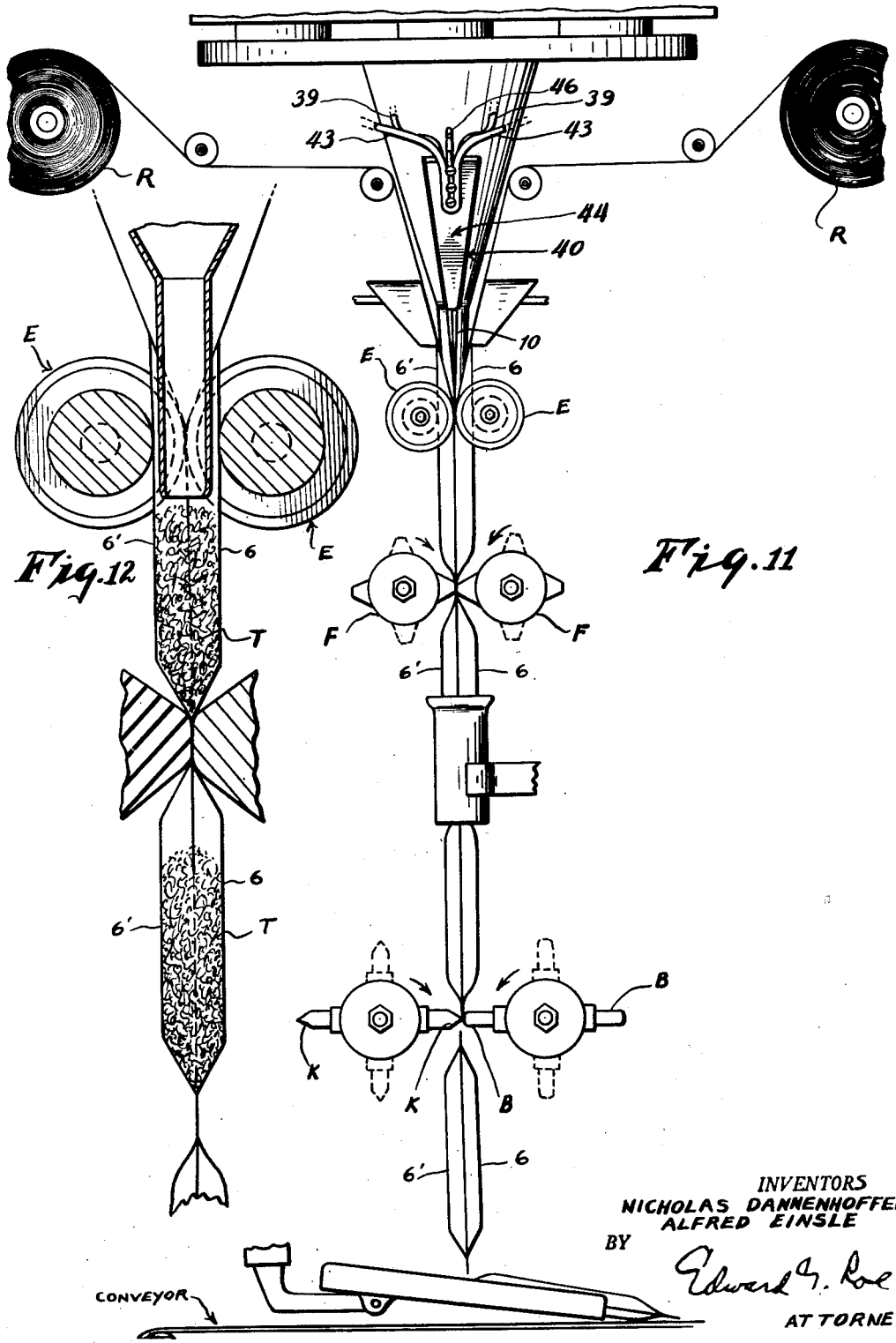

United States Patent Office 2,787,548
Patented Apr. 2, 1957

2,787,548

INFUSION PACKAGES AND METHODS OF MAKING SAME

Nicholas Dannenhoffer, Ridgewood, and Alfred Einsle, Elmhurst, N. Y., assignors to Eppens, Smith Company, Inc., Long Island City, N. Y., a corporation of New Jersey Application September 2, 1955, Serial No. 532,228

2 Claims. (Cl. 99—77.1)

Generally, the invention relates to beverage infusion packages and a method of manufacturing the same, and specifically, it comprehends improvements in tea bags used for making quantities of iced tea and improvements in methods of manufacturing said bags.

Heretofore, a great disadvantage of the conventional filter paper bag used for making iced tea was its tendency to split when immersed in the boiling water and jerked to and fro to hasten the making of the tea, a manifestly undesirable attribute.

To overcome this tendency, various expedients have been and are used, one of which is to stitch the longitudinal edge and additionally one end of the package as a double reinforcement. This double stitching operation is time consuming and costly.

We have devised an improved tea bag and method of manufacture which overcomes the foregoing disadvantage and eliminates the necessity for a double stitching operation, it being only necessary to stitch the bag along one longitudinal edge, the extension of which stitching becoming an elongated string handle.

Briefly described, the improved bag comprises two blanks of filter paper or other suitable material having four marginal edge areas heat and pressure sealed, after a charge of tea has been inserted, with one longitudinal edge being doubly reinforced by a folded strip of filter paper interposed between the confronting edges of both blanks before they are heat and pressure sealed. The aforesaid reinforced longitudinal edge is therefore stitched, and one twisted loose end of thread forms an elongated handle with which to manipulate the tea bag. The double stitching operation is eliminated, and the bag is precluded from splitting open.

One preferred method of manufacturing is illustrated in the drawings and described below.

Fig. 8 is a cross sectional view of part of the mechanism taken through line 8—8 of Fig. 7;

Fig. 9 is a partial front view of pulley taken through line 9—9 of Fig. 8;

Fig. 10 is a partial exploded view of pulley and components;

Fig. 11 is a front schematic view of mechanism attachment in respect to existing machine;

Fig. 12 is a partial sectional view showing existing means of sealing edges of bag.

In the drawings, like numbers refer to like parts, and it is understood that where reference is made to "tea bag" that it is intended that the bag may be employed for making infusions of beverages other than tea, for example the South American beverage called maté.

Figures 1, 2, 3:
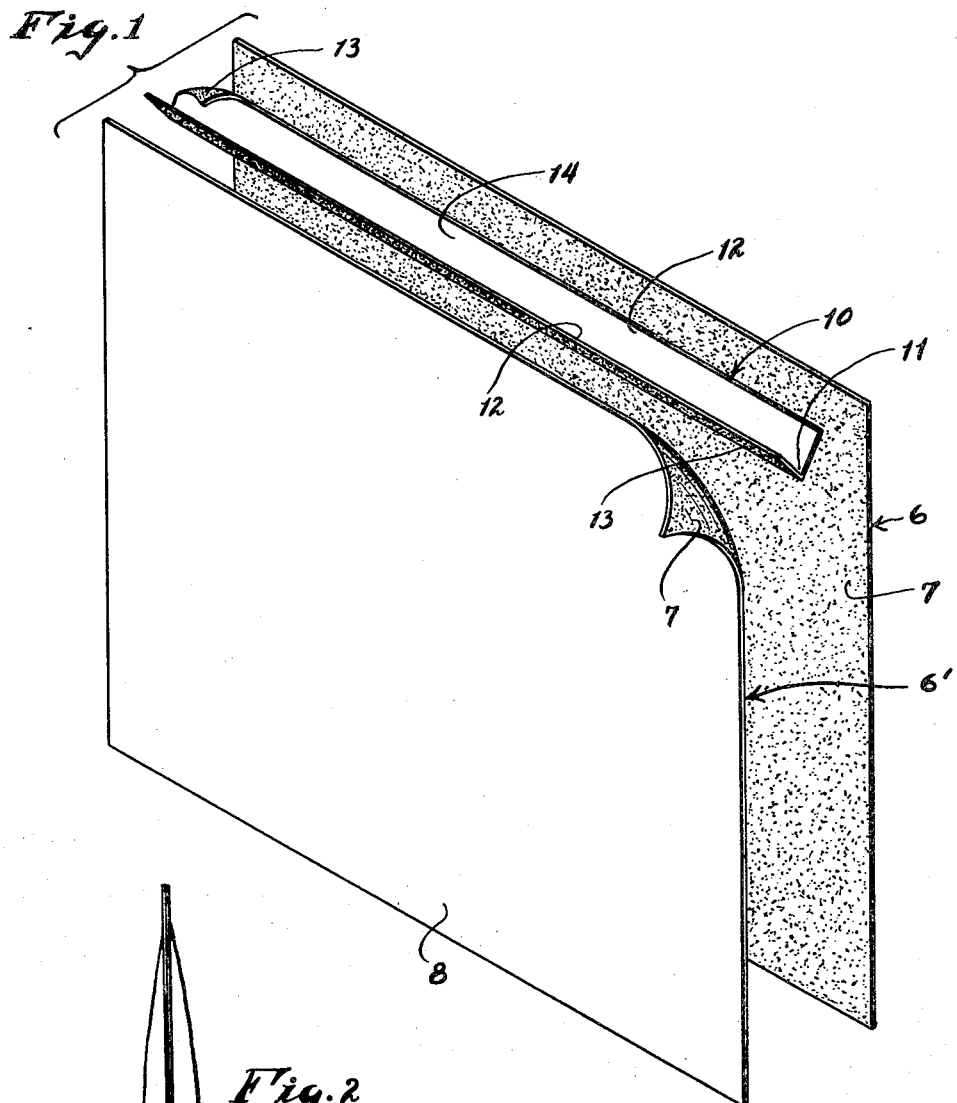
Figure 1 is a perspective view showing the components of our improved tea bag.
Fig. 2 is an end assembly view of the bag showing the edge assembly, not sewed.
Fig. 3 is an enlarged sectional view showing the reinforcement.

Referring to the drawings and for purposes of explication, marshalled below are the numbered parts of the improved tea bag and the method of manufacturing same:

5—assembled tea bag
6—a rectangular blank of filter paper
6'—the companion blank
7—the treated inside of the aforesaid blanks
8—the outside thereof
9—web of paper from which blanks 6 and 6' are struck
10—reinforcing strip of filter paper
11— groove or fold in paper
12—the companion folds in strip 10
13—treated inside of reinforcing strip
14—outside of reinforcing strip
15—stitching which merges into tea bag handle
16—tea bag string handle
18—axle
19—hook-shaped extension rigidly mounted on support not shown on existing machine
20—brace
21—U-clamp
22—rigidly affixed collar
23—pin disposed through collar 22 in parallelism with axle 18
24—brake
25—spring between brake 24 and pin 23
26—pulley carrying pin 27
27—pin
28—shoulder of pulley
29—hub
30—threads on hub
31—spacer on hub
32—nut
33—fork lock pin
34—slot in hub
35—outside plate of pulley affixed with key to fit in slot 34
36—spool of filter paper which forms reinforcing strip
37—shaft mounted on heat and pressure sealing machine
38—inner pair of adjustable collars with recessed set screws
39—inward converging pair of rods
40—inwardly converging V-shaped trough
41—swinging yoke
42—pair of collars
43—pair of diverging arms
44—bar attached to yoke
45—set screws attaching bar to yoke
46—hook-shaped leader
47—suspension bracket With special reference to Fig. 1, our improved infusion bag comprises two companion blanks of filter paper 6 and 6', the insides 7 of which are treated with a thermo-plastic lamina of a type which enable the producing of a sealed joint along each of the marginal edges upon the simultaneous application of heat and pressure thereto. While the blanks are shown rectangular-like, it is within the inventive concept that they may be shaped otherwise than rectangular. And we comprehend using any suitable material other than filter paper, capable of making infusions.

Compared to the conventional tea bag, the beverage infusion package which we have produced is relatively large, for example, it may be 6" by 4¾" and hold about an ounce of tea, sufficient, after it has been steeped in boiling water, to make a gallon of iced tea. Iced tea has gained in popularity as a summer thirst-quenching beverage, and the demand for a comparatively large beverage infusion package has boomed. In known packages, as hereinbefore pointed out, the disadvantages of the large iced tea bags has been their tendency to split open at the seams when the bag is immersed in boiling water and impelled or jerked to and fro to hasten the making of the tea. To overcome this attribute, which resulted in the spilling of the tea contents into the brew, it has been necessary to perform two separate operations—first, to stitch along one end of the package and secondly to stitch one side, the side which carries the woven thread extension forming the undulating handle with which to manipulate the bag.

Reverting to Fig. 1, with numeral 7 designating the treated inside faces of the companion blanks 6 and 6', we employ the numeral 8 as denoting the outside faces of the blanks which are untreated, and which may be fed from reels of paper R, as denoted in Fig. 11.

Between the marginal edges of one side of the blanks 6 and 6', we provide a double reinforcing strip 10, which as depicted in Fig. 1, comprises a separate and distinct folded strip of filter paper having companion folds 12 and groove 11, with the inside 13 being treated thermoplastically, similar to the inside faces of the companion blanks 6 and 6', with 14 denoting the untreated outside of the strip. The folded strip extends substantially the length of the marginal edges.

Figure 6:
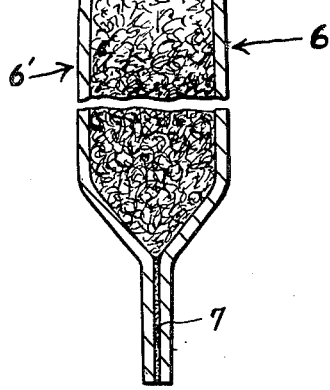
Fig. 6 is a cross sectional view along the lines 6—6 of Fig. 4.

Our reinforcing strip is heat and pressure sealed between the outer marginal edges of one side of the blanks 6 and 6', with the reinforcing strip folded and the double layer sealed between the edges of the blanks 6 and 6', see Fig. 6, after which the bag is stitched along this edge as at 15, the stitching being continued to form the pendant string handle with which the bag is manipulated.

We have found that the interposition of doubled or folded reinforcing strip 10 between the marginal edges of longitudinal side of the bag eliminates en toto one stitching operation, that is the previously necessary stitching of one end. This was costly and time consuming, due to the necessity for one more separate operation and attendant handling of the bags by an operative.

Figure 4:
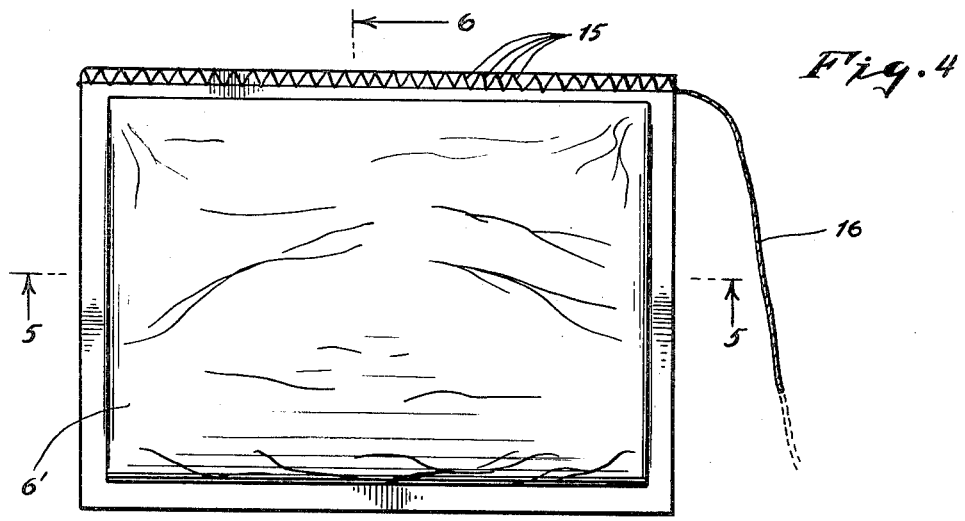
Fig. 4 is a side view illustrating a completed tea bag.
Figure 5:
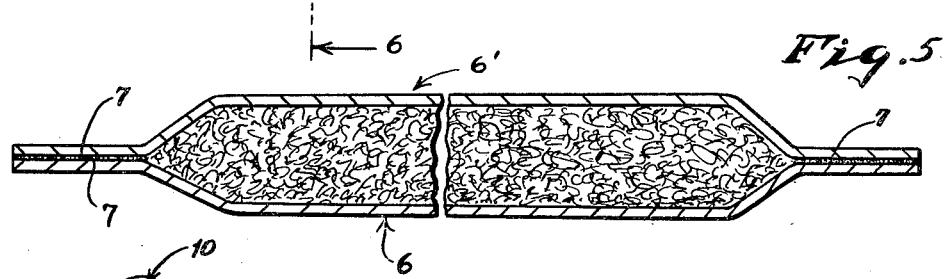
Fig. 5 is a cross section along lines 5—5 of Fig. 4.

Fig. 2 depicts the bag with the edge at which the reinforcing strip is interposed, with the edge being split to more clearly demonstrate the components and before the stitching operation. The bag, holding a charge of tea T, is shown after heat-pressure sealing and stitching is shown in Fig. 4 with Fig. 6 illustrating the reinforced edge to a nicety.

The modus operandi by which we produce the bag follows:

Axle 18 is mounted in front of a heat and pressure sealing machine and provided with an obliquely extending arm 19 rigidly secured to said machine. Brace 20 also mounted on the machine and extending above axle 18 holds U-clamp 21 which enfolds and secures axle 18 against untoward movement.

Outwardly of the clamp we mount collar 22 on the axle 18 having an upwardly disposed portion through which is inserted pin 23 which is seated in brake 24 and prevents its rotation. Brake 24 is also spaced apart from collar 22 by spring 25.

Abutting brake 24 and precluded from free running or idling thereby is pulley 26 carrying pin 27. From shoulder 28 extends hub 29 threaded as at 30 at its outer end.

A spacer 31, nut 32 and fork lock pin 33 with hub 29 having a slot 34, and outside plate 35 having a key to mate with slot 34 completes the mount for spool 36 of filter paper. As it is highly desirable for the operator to expeditiously change spools, it can be readily seen that simply lifting up the fork lock pin 33, turning nut 32 a few times, permits facile removal of the used spool of filter paper used for the reinforcing strip and a new mounting of a fresh roll with pin 27 embedded in the hub of spool 36. Brake 24 exerts pressure against the side of sprocket 26 and insures constant tension on the reinforcing strip as it runs from the spool.

In parallelism with axle 18 and mounted on the machine M we provide bracket 37 having an inner pair of adjustable collars 38 with recessed or "Allen" set screws in which are rigidly affixed a downwardly and inwardly converging pair of rods 39 on which is mounted a similarly downwardly quasi-V-shaped trough 40. It is of paramount importance that the pair of collars 38 be adjustable for the filter paper fed from spool 36 must be equi-distanced from each of the strips of paper P being fed from rolls R. Thus, if the paper from spool 36 is not equi-distanced the collars 38 may be loosened and trough 40 moved either right or left.

Figure 7:
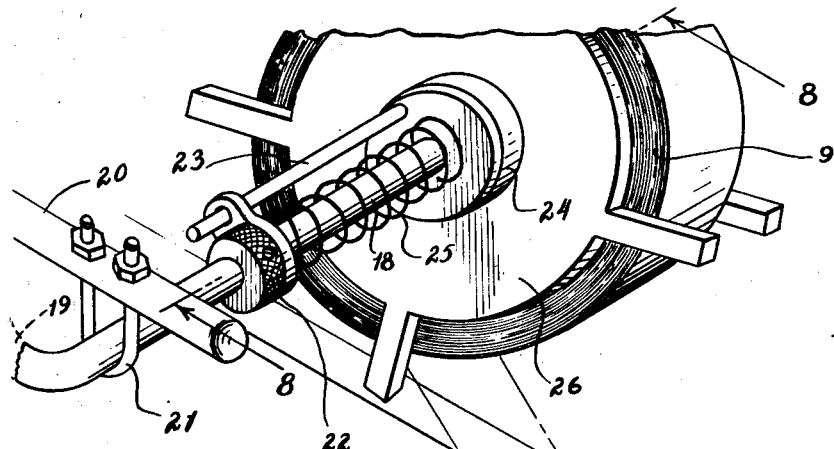
Fig. 7 is a perspective view of component parts of mechanism attachment for producing aforementioned reinforced tea bag.
Figure 7:
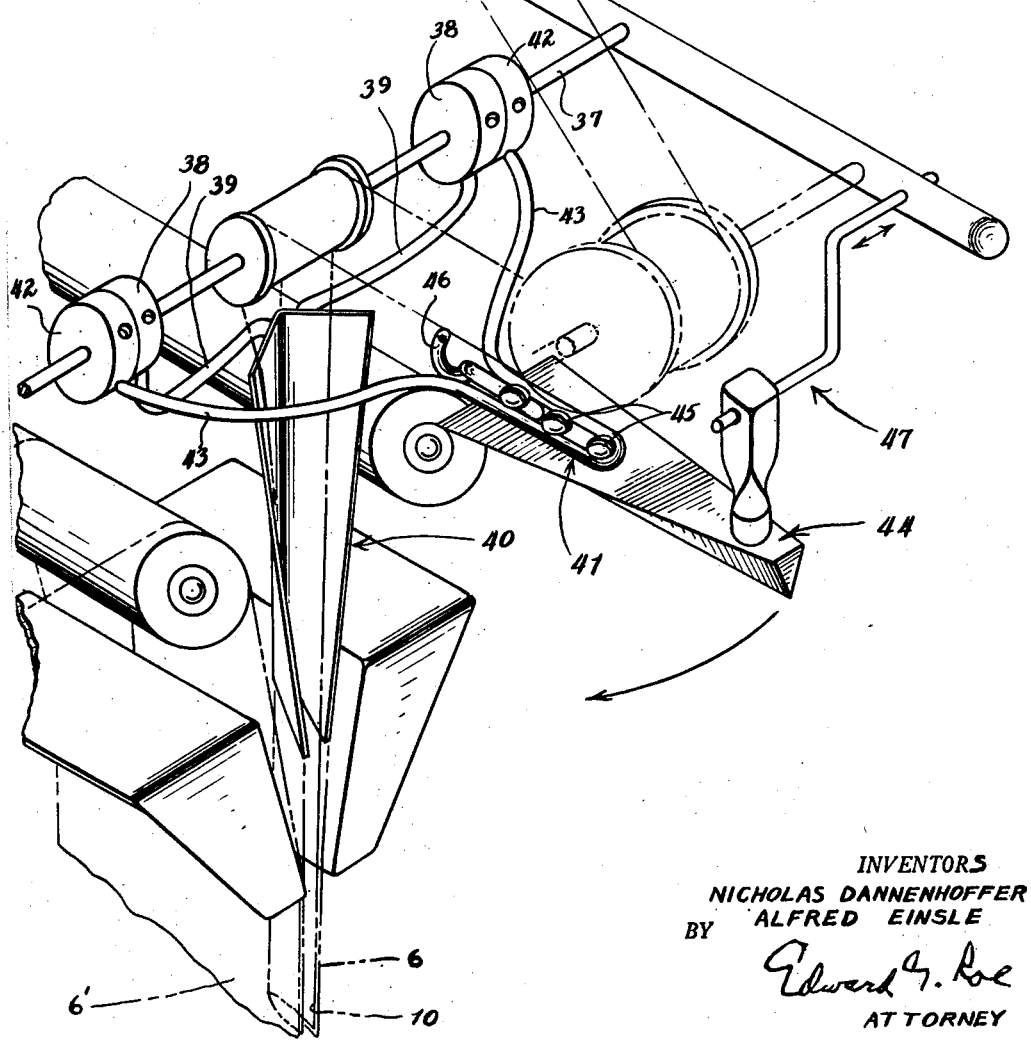

A second adjustment permitted and absolutely necessary is to allow trough 40 to be swivelled either in or out to insure that the leading edge of the paper fed from roll 36 is in the same plane and lines up exactly with the leading edges of the filter paper being fed from rolls R, as shown in Fig. 7. This is a necessity so that heat and pressure elements E can compress the folded reinforcing strip as it runs between the mating edges of the blanks 6 and 6', and is sealed simultaneously with the mating edges of the blanks of the opposite side of the blanks by heat and pressure sealing elements E, see Figs. 7 and 8.

As a helper to insure at the outset that the filter paper from roll 36 is creased and folded as it emerges from the relatively narrow bottom egress of trough 40, we have a swinging yoke 41 consisting of a pair of diverging arms 43 rigidly mounted in collars 42 on bracket 37 with bar 44 attached to the yoke, this bar being so conformed that it will be accommodated to a nicety within trough 40. Set screws 45 allow adjustments of the bar 44 and upwardly extending hook-shaped leader 46 up or down, an adjustment occasionally made to accomplish maximum efficiency in creasing the filter paper from roll 36 and leading it into trough 40. Similarly collars 42 may be moved laterally if desired while set screws 45 permit adjustment as described before. When not in use, yoke 41 may be readily swung upwardly and suspended out of the way.

Our attachment can be fitted on known and existing heat and pressure sealing machines of the automatic type, parts of which are shown in the drawings with the charges of tea or other filler being fed from a source positioned above the machine down between the blanks of filter paper as elements F sequentially close and heat and pressure seal the bottom of one and top of the following package which is later severed by knife K and butt rod B from the continuous web, with the package being dropped on the slanted trough, sliding the sealed bags onto a conveyor belt carrying it to the next operation.

We reserve the right to make such changes or modifications as may come within the scope of the appended claims.

We claim:

1. An oversized beverage infusion package comprising a bag containing a predetermined quantity of beverage infusion material, said bag comprising a pair of identically sized rectangular sheets of filter paper in superposed relation, each of said sheets having their inside surfaces treated with thermoplastic lamina of the type which produces a sealed joint upon the simultaneous application of heat and pressure, a separate and distinct reinforcing folded strip of filter paper having the outside surfaces of the folds similarly treated, the reinforcing strip interposed between and substantially the length of the marginal edges of one of the longer sides of said sheets, the strip and marginal edges being heat and pressure sealed, the other side and opposite ends of the bag also being heat and pressure sealed, the side including the folded strip being stitched, said stitching terminating in a pendant handle for manipulating the bag in boiling water, the bag being characterized by resistance to tearing when the bag is manipulated.

2. In a method of manufacturing an oversized beverage infusion package, the improvement which consists of simultaneously feeding two webs of filter paper treated on their inside surfaces with a thermoplastic lamina of the type which produces a sealed joint upon application of heat and pressure and a separate and distinct reinforcing folded strip of filter paper having the outside surfaces of the folds similarly treated between heat and pressure sealing means, and sealing the marginal edges of one side of the sheets simultaneously with the sealing of the folded strip between the substantial length of marginal edges of the other side of the sheets, sealing one end of said sheets, inserting a filler of beverage infusible material, heat sealing the opposite end of said sheets, the side having the folded strip sealed therein being further stitched, and said stitching being continued to form a handle with which the package is manipulated.

References Cited in the file of this patent

UNITED STATES PATENTS

| | | |
|---|---|---|
| 1,514,244 | Allatt | Nov. 4, 1924 |
| 2,186,087 | Yates | Jan. 9, 1940 |
| 2,313,696 | Yates | Mar. 9, 1943 |
| 2,359,292 | Barnett | Oct. 3, 1944 |
| 2,364,903 | Howard | Dec. 12, 1944 |
| 2,571,138 | Irmscher | Oct. 16, 1951 |